Patented Jan. 25, 1949

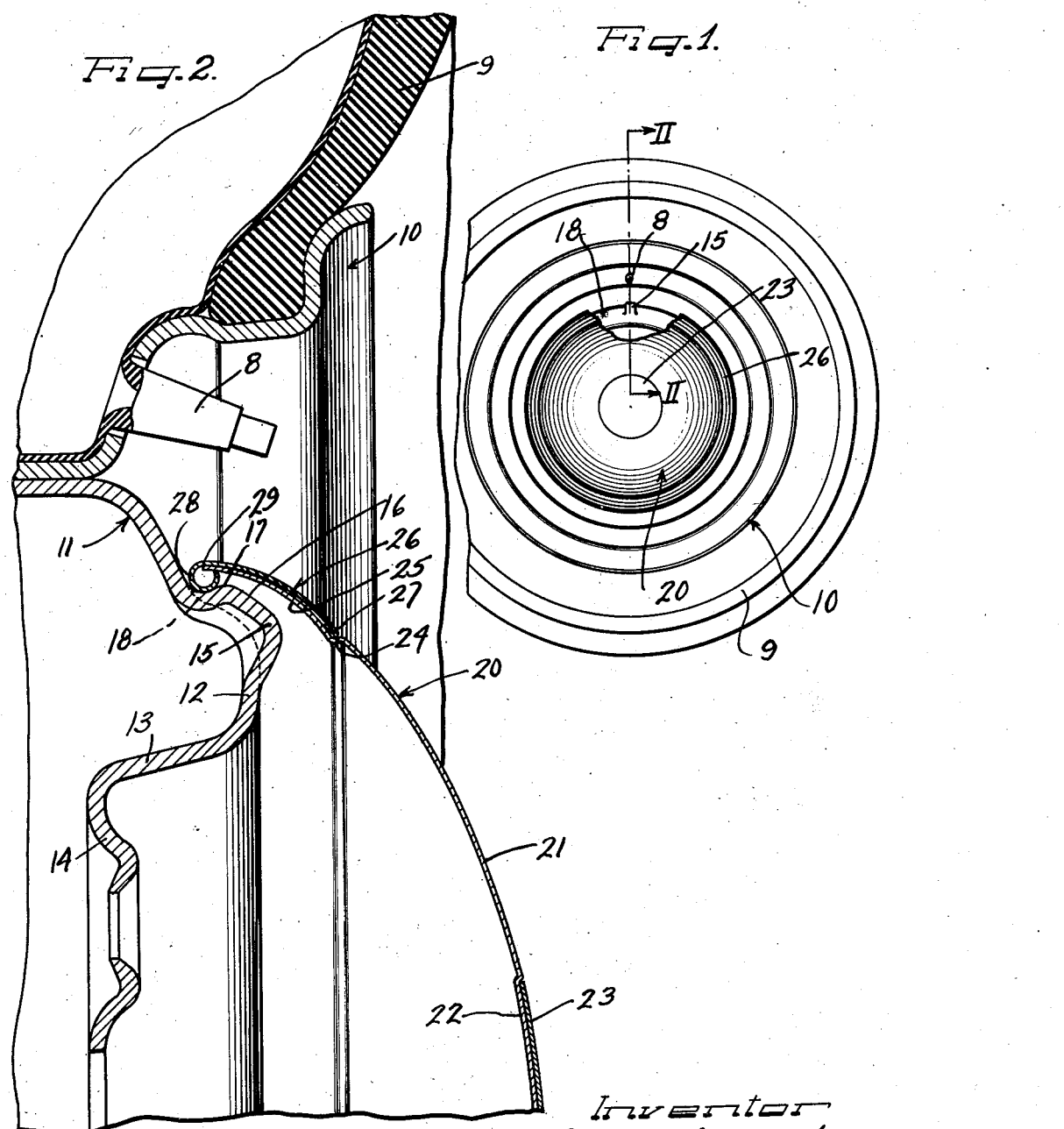

2,459,890

UNITED STATES PATENT OFFICE 2,459,890

WHEEL HUBCAP STRUCTURE

George Albert Lyon, Allenhurst, N. J.

Application October 15, 1945, Serial No. 622,448

8 Claims. (Cl. 301—108)

1

This invention relates to a wheel cover structure, and more particularly to a novel hub cap and the retention of the same on an automobile wheel.

An object of this invention is to provide a simple form of hub cap which may be very economically manufactured and still possess the necessary operating characteristics to enable its proper detachable retention on a wheel.

Another object of this invention is to provide a hub cap with an outer resilient deflectable edge portion which does not necessitate that the entire hub cap be made of expensive springy material, such, for example, as spring steel.

In accordance with the general features of this invention there is provided a wheel hub cap comprising a dished shell of metal including a central crown portion and a curved outer margin and an annular ring of highly resilient metallic material curved to conform to and tightly nest over the outer shell margin and having a continuous outer turned edge substantially beyond the outer edge of the shell; the ring providing the hub cap with a resiliently deflectable outer edge for snap on detachable retaining engagement with the wheel.

In accordance with still other features of my invention there is provided a novel combination including a wheel body member having spaced retaining protuberances extending radially beyond an annular hub cap seat and a hub cap provided with a flexible outer margin to be snapped over the protuberances and beyond the same onto the seat. This arrangement is such that the edge portion of the hub cap is deflected radially outwardly at its points of engagement with the protuberances and is stressed radially inwardly at intermediate points so as to bottom on the annular seat provided on the outer face of the body or load-bearing part of the wheel.

Other objects and features of this invention will more fully appear from the following detailed description taken in connection with the accompanying drawings, which illustrate a single embodiment thereof and in which:

Figure 1 is a fragmentary side view of a wheel structure having applied thereto a hub cap of my invention; and Figure 2 is an enlarged fragmentary cross sectional view taken on substantially the line II—II of Figure 1 looking in the direction indicated by the arrows.

As shown on the drawings:

The reference character 9 designates generally a conventional pneumatic automobile tire

2 and tube mounted in the usual way upon a multi-flange drop center type of tire rim 10, which constitutes one element of the automobile wheel. A valve stem 8 of the tire assembly 9 projects in the usual way through an aperture in one of the side flanges of the tire rim 10.

As is customary in the wheel art, the tire wheel is attached to and carried by a load-bearing or body member 11, which comprises a dished metallic stamping. This body member 11 comprises an axially outwardly bulged central or nose portion 12, a rearwardly inclined flange portion 13 and a radially extending bolt-on flange 14. This bolt-on flange, as is customary in the art, is adapted to be detachably secured to a part of an axle by means of cap screws or bolts (not shown).

Now it is very important in the manufacture of load-bearing members for a wheel that they be so constructed as to withstand the stress and strain incident to the operation of the wheel under even the most severe road conditions. Heretofore it has been the practice to fasten the hub cap to such body members by means of spring clips fastened to the body member. This necessitated aperturing of the body part in order to attach the spring clips. Obviously any aperturing in the body part weakens the same and requires that the body part be either made of heavier stock or that it be provided with adequate rigidifying ribs or corrugations at the locale of the apertures.

Now I propose to provide a wheel body member 11 which does not use spring clips to hold the hub cap on but which employs hub cap retaining protuberances of such arrangement and location that they will materially contribute to the rigidifying of the body member, in addition to their function of detachably holding the hub cap or wheel cover on the wheel.

Such protuberances are designated by the reference character 15 and may be of any suitable number, such, for example, as three to five, and arranged in a common circle on the nose portion 12 of the body part 11. These protuberances may be suitably pressed from the body part and are preferably located in the vicinity of the base of the tire rim 10 so that a relatively large hub cap can be used.

Each protuberance has a radially outwardly facing lead-in surface 16 terminating in a hump or high point 17 axially inwardly of the lead-in surface.

To the rear of the high points 17, the body part is provided with an annular groove or depression 18, the bottom of which is in a circle of a diameter substantially less than the diameter of the circle in which the high points 17 are located. As a consequence, an annular seat is provided for the hub cap which is located substantially radially inwardly of the bumps thereby necessitating a distortion of the edge of the hub cap 20, to be hereinafter described, in order for it to be properly seated on the body part.

My present invention is especially concerned with the construction of the hub cap or wheel cover 20. This cover includes a dished or crown portion 21 having a central indentation 22 in which may be secured a suitable medallion 23. The crown portion 21 is provided with an annular indentation or shoulder 24 which is at the junction of the crown portion 21 and an outer annular curved margin 25 of the dished shell.

Tightly nested over and interlocked with this annular margin 25 is an annular ring 26 which has a radially inner turned edge 27 arranged to bottom against the shoulder 24 and an outer annular hollow bead 28 of such diameter as to have a snap-on retaining cooperation with the bumps or protuberances 15.

It should be perceived that the hollow annular bead 28 extends substantially beyond the outer edge 29 of the main hub cap shell, which edge 29 projects only to a slight extent into the bead 28. This leaves the bead 28 free to flex as it is being resiliently stressed in the application and removal of the hub cap 20 with respect to the wheel.

The bead 28 is preferably formed on the ring 26 after the ring has been nested over the outer margin 25 so as to tightly interlock the ring with the outer margin.

The aforesaid arrangement is highly desirable in that the crown or dished portion 21 of the hub cap 20 may be made of a relatively rigid material, as compared with the material of the resilient ring 26. For illustration, the part 21 may comprise a stamping from a sheet of low carbon steel. On the other hand, the ring 26 may be rolled from spring steel strip or stock, such, for example, as stainless steel. The process of making and interconnecting these parts is the subject of a separate copending application Serial No. 622,447 filed October 15, 1945.

The two parts, 21 and 25, of the hub cap 20 lend themselves to a highly decorative appearance. For illustration, the exposed portion of the part 21 may be given a dark external finish, such, for example, as black, or in the color of the body of the vehicle. The stainless ring 26 may be given a highly lustrous external finish so that it will highly ornament the outer margin of the hub cap. The medallion 23 at the center of the hub cap may have a lustrous finish, if desired, and it will be found that the exposed portion of shell 21 between the medallion 23 and the ring 26 by reason of its darker color will serve to set off the medallion and the ring.

In the application of the hub cap 20 to the wheel, it is first aligned with the bumps so that its curved springy edge 28 strikes the lead-in surfaces 16 of the bumps or protuberances. By slight axial pressure on the hub cap, the beaded edge 28 is cammed upwardly over the lead-in surfaces 16 and over the high points 17 of the protuberances until it snaps over and behind the high points and into retaining engagement with the bottom of the annular groove 18.

Now due to the fact that the bumps 17, even at their axially rear sides, are located in a circle of a diameter greater than that of the bottom of the groove 18, it follows that the beaded edge 28 will be stressed radially outwardly at the bumps but will tend to contract between the bumps tightly against the bottom of the groove 18 thus retaining the hub cap under tension on the wheel.

When it is desired to remove the hub cap the same may be readily effected by inserting the edge of a pry off tool under the beaded edge 28 and forcibly prying it free of its retaining engagement with the bumps 15.

I claim as my invention:

1. As an article of manufacture a wheel hub cap comprising a dished shell of metallic material including a central crown portion and a curved outer margin and an annular ring of highly resilient metallic material curved to conform to and tightly nest over said outer shell margin and having a continuous outer turned edge beyond the outer edge of said shell, said ring providing said cap with a resiliently deflectable outer edge for snap on detachable retaining engagement with a wheel, said crown portion and curved outer margin being connected by an indented shoulder portion and said ring having an inner edge tightly seated on said shoulder portion.

2. In a wheel structure, a wheel including a load bearing part having a plurality of spaced radially outwardly projecting protuberances arranged in a common circle, each of said protuberances including a lead-in surface terminating in a radially outer high point, said part also having an annular groove radially inwardly of said high points in which an edge of a hub cap is adapted to bottom and a wheel hub cap cooperable with said protuberances comprising a dished shell of metallic material including a central crown portion and a curved outer margin and a separate annular ring of highly resilient metallic material curved to conform to and tightly nest over said outer shell margin and interlocked therewith, said ring having a continuous outer edge substantially beyond the outer edge of said shell, said ring providing said cap with a resiliently deflectable outer edge of such diameter as to require deflection in order for the same to be snapped over said high points of the protuberances and into retaining engagement with the load bearing part at the bottom of said groove.

3. As an article of manufacture a wheel hub cap comprising a dished shell of metallic material including a central crown portion and a curved outer margin and an annular ring of highly resilient metallic material curved to conform to and tightly nest over said outer shell margin and having a continuous outer turned edge beyond the outer edge of said shell, said ring providing said cap with a resiliently deflectable outer edge for snap on detachable retaining engagement with a wheel, said crown portion and curved outer margin being connected by an indented shoulder portion and said ring having an inner edge tightly seated on said shoulder portion, said turned edge being turned around and under the outer edge of said shell to hold said ring on said shell and against said shoulder portion.

4. As an article of manufacture a wheel hub cap comprising a dished shell of metallic material including a central crown portion and a curved outer margin and an annular ring of highly resilient metallic material curved to conform to and tightly nest over said outer shell margin and having a continuous outer turned edge beyond the outer edge of said shell, said ring providing said cap with a resiliently deflectable outer edge for snap on detachable retaining engagement with a wheel, said crown portion and curved outer margin being connected by an indented shoulder portion and said ring having an inner edge tightly seated on said shoulder portion, said turned edge being turned around and under the outer edge of said shell to hold said ring on said shell and against said shoulder portion, the outer surface of said ring and the exposed outer surface of said shell being substantially flush and constituting portions of a substantially uniformly curved overall surface.

5. As an article of manufacture, a wheel cover comprising a circular shell having a marginal portion, and an annular metallic ring overlapping said marginal portion in substantially parallel relation thereto and projecting as a continuation thereof only slightly beyond the marginal portion, the projected portion of the ring being formed into a continuous springy retaining edge on the cover in close proximity to and interlocked with the edge of the marginal portion and resiliently yieldable in the application of the cover to a wheel, the other edge of said ring bearing on the axially outer surface of said shell.

6. As an article of manufacture, a wheel cover comprising a circular shell having a marginal portion, and an annular metallic ring overlapping said marginal portion in substantially parallel relation thereto and projecting as a continuation thereof only slightly beyond the marginal portion, the projected portion of the ring being formed into a continuous springy retaining radially outer edge on the cover in close proximity to the edge of the marginal portion and resiliently yieldable in the application of the cover to a wheel, the edge of said cover marginal portion being interlocked with said outer ring edge and concealed thereby, the other and radially inner edge of said ring projecting over and onto the axially outer surface of said shell.

7. As an article of manufacture, a wheel cover comprising a circular dished shell having a marginal portion of convex-concave cross section and an annular ring overlapping said marginal portion so as to be substantially coextensive therewith and having a radially outer edge extending only slightly beyond the edge of the marginal portion so as to be in close proximity thereto and formed into a continuous circular bead providing the shell with a cover retaining edge of greater springy qualities than that of the metal of the shell, said ring having its radially inner portion overlying and supported on the axially outer surface of said shell.

8. As an article of manufacture, a circular wheel cover having a marginal portion of curved cross section and a transversely curved annular ring of metallic material of substantially greater resiliency than that of said cover and substantially concentrically overlapping said marginal portion in close relation thereto, said ring including an extension radially beyond the edge of said marginal portion and formed into a turned continuous cover retaining the edge resiliently flexible at the edge of the marginal portion in the application of the cover to a wheel.

GEORGE ALBERT LYON.

REFERENCES CITED

The following references are of record in the file of this patent:

UNITED STATES PATENTS

| Number | Name | Date |
| --- | --- | --- |
| 2,190,669 | Lyon | Feb. 20, 1940 |

FOREIGN PATENTS

| Number | Country | Date |
| --- | --- | --- |
| 456,866 | Great Britain | Nov. 17, 1936 |